P. H. JACKSON.
Improvement in Steering Apparatus.
No. 132,467. Patented Oct. 22, 1872.
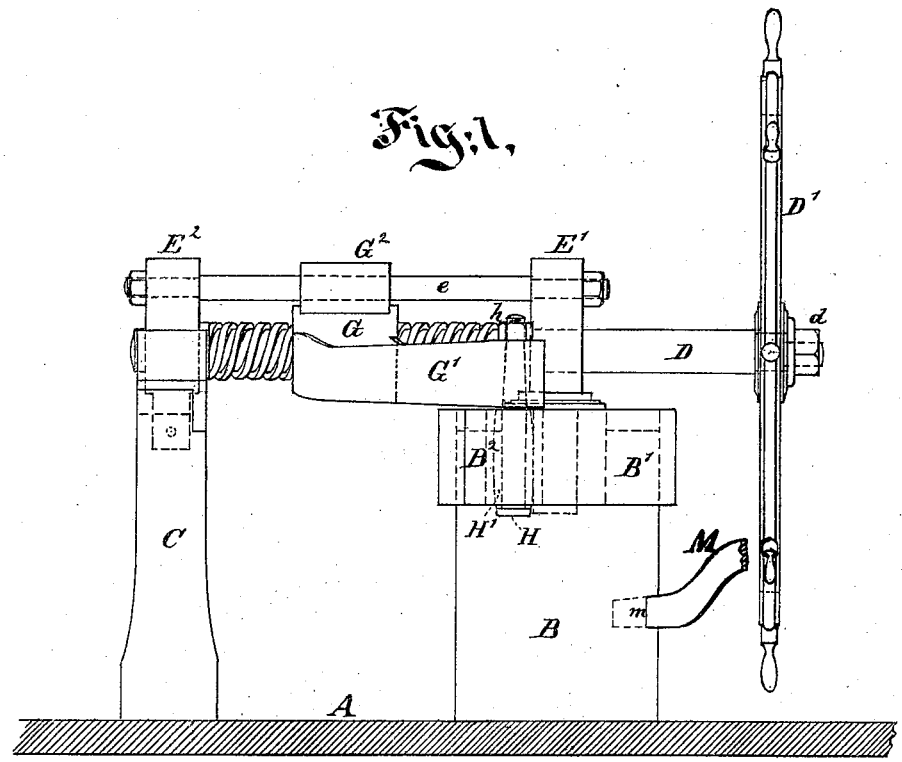
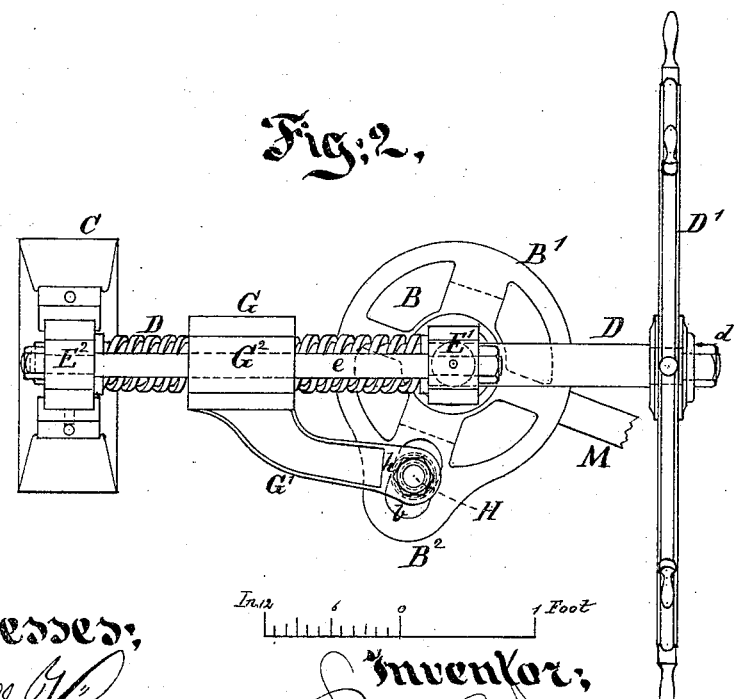
Witnesses:
Arnold Hormann
Wm C Dey
Inventor:
Peter H Jackson

UNITED STATES PATENT OFFICE.

PETER H. JACKSON, OF NEW YORK, N. Y.

IMPROVEMENT IN STEERING APPARATUS.

Specification forming part of Letters Patent No. 132,467, dated October 22, 1872.

*To all whom it may concern:*

Be it known that I, PETER H. JACKSON, of New York city, in the State of New York, have invented certain Improvements in Ship-Steering Mechanism, of which the following is a specification:

The advantages due to simplicity in steering mechanism, and especially to the employment of a single stout screw with a single whole nut embracing it, and properly guarded against turning round therewith, and with a simple and direct connection to the rudder-head are well appreciated. For vessels of moderate size, and especially for sailing yachts, there is a great advantage in steering by the tiller with light winds, using the wheel with the screw mechanism only in heavy weather.

I have devised mechanism which allows the rudder to be shipped and unshipped instantly, and to be used without any interference from wheel or stanchion, and which allows the wheel and its connected mechanism to be put in use or thrown out of use very simply and rapidly and with necessity for very little skill. The forward bearing of the wheel-shaft is on the center of the rudder-head, and the rudder is free to turn without affecting the position of the bearing. The other bearing of the wheel-shaft is abaft of the rudder. A stout nut travels on the screw, embracing it and properly guided, and carries a pin, which stands in a radial slot in a stout arm fixed on the rudder-head. A complete disconnection of the rudder from the wheel and its connections is effected by simply driving out the pin from the arm.

The following is a description of what I consider the best means of carrying out the invention.

The accompanying drawing forms a part of this specification.

Figure 1 is a side elevation with a portion of the tiller broken away, and Fig. 2 is a plan view, showing the same parts.

Similar letters of reference indicate like parts in all the figures.

A is the deck of the vessel, and B the rudder-head. C is a stanchion mounted a sufficient distance in rear of the rudder, and D is the wheel-shaft carrying a stout square thread, as represented, and supported in bearings $E^1$ $E^2$. The forward bearing $E^1$ is pivoted in the rudder-head in line with the axis thereof. The after bearing is mounted in the stanchion C, and both bearings $E^1$ $E^2$ are capable of being lifted to accommodate the occasional violent rising and sinking motion of the rudder. A stout nut, G, having two arms, $G^1$ $G^2$, is mounted on the wheel-shaft D, so that it shall be moved forcibly forward and backward by the screw-threads thereon as the wheel is turned in one direction or the other. The long arm $G^1$ extends forward and receives the pin H in a vertical-tapering hole formed with the larger end downward, as represented. The short arm $G^2$ receives a cylindrical guide-rod, $e$, which extends between the two supports $E^1$ $E^2$, as shown. The top of the rudder-head carries a stout casting, $B^1$, firmly connected by being let into the wood, as shown, and constructed with the stout arm $B^2$, which has a large radial slot, $b$, of such dimensions as to receive all that portion of the pin H which extends below the arm $G^1$. The slot is of sufficient width to accommodate not only the pin H but also a roller, $H^1$, which surrounds it, and which, by turning freely, guards against the liability of the pin H or slot $b$ to abrade or cut each other under the great strains and considerable motion to which they are subjected. That part of the pin H which enters the arm $G^1$ is tapered to correspond with the tapering form of the hole in which it fits, and it is secured by a nut, $h$, which fits on a threaded end, which projects above the arm $G^1$. The parts are made from brass or other non-oxidizable metal, or are so coated as to guard effectually against oxidation or corrosion. I propose to employ, as a preferable material, iron or semi-steel nickel plated.

The socket $m$, which receives the tiller M, is at such level that the tiller may be introduced and removed freely without interference from the wheel. It may be below the wheel-rim or above; I prefer to place it above, as shown. In either position, when the wheel and its connected mechanism is set free from the rudder by the removal of the pin H, the tiller may govern the rudder in precisely the ordinary manner. When the tiller is moved hard over to either side the wheel is free to turn a little in obedience to a gentle pressure against one of the spokes or handles and the wheel offers no resistance.

The exigencies of navigation in working a vessel heavily crowded with sail sometimes cause the loss of a few minutes or even a few seconds to be seriously felt; under some conditions it may result in the jibing or luffing of the vessel, so as to cause her total loss. This invention allows the tiller to be always introduced at any time without a second's delay, and the wheel mechanism may be disconnected from the rudder in the time required to unscrew the nut $h$ and strike a single smart blow on the upper end of the pin H.

The substitution of the wheel mechanism for the use of the tiller may be effected with nearly equal rapidity. While the tiller is handled, as usual, by the helmsman maintaining perfect control, and held tolerably steady, the pin H is introduced in the slot $b$, thrusting it up from below into the hole in the arm $G^1$. In case the position of the wheel-shaft shall be such as to hold the arm $G^1$ in the wrong position to receive the pin H, under these conditions, the wheel $D^1$ may be temporarily set free from the wheel-shaft D by removing the nut $d$, and the wheel-shaft may be turned by any suitable means into the right position; then the pin H being introduced and secured, the vessel being held with the rudder steady for a few seconds, the wheel may be again connected and secured, and the tiller then instantly removed and the wheel be depended on again for steering, as before.

I claim as my invention—

1. The wheel-shaft bearings $E^1 E^2$, mounted, respectively, on the rudder-head, and a stanchion abaft thereof, with means for disconnecting and connecting with the rudder, and the tiller-socket $m$, arranged as represented, so as to receive the tiller and allow it to work without interference from the wheel, all substantially as herein specified.

2. In connection with the above the tapering pin H and roller $H^1$, mounted on the arm $G^1$ of the nut G, and matching in the slot $b$, as a means of ready and reliable connection and disconnection, as specified.

In testimony whereof I have hereunto set my hand this 15th day of April, 1872, in the presence of two subscribing witnesses.

PETER H. JACKSON.

Witnesses:
ARNOLD HÖRMANN,
WM. C. DEY.